United States Patent
Wilk et al.

(10) Patent No.: US 9,899,054 B2
(45) Date of Patent: Feb. 20, 2018

(54) APPARATUS AND SYSTEM TO SECURE AND MAINTAIN INTEGRITY OF A PHYSICAL DISC

(71) Applicant: Disney Enterprises, Inc., Burbank, CA (US)

(72) Inventors: Lawrence Wilk, Pacific Palisades, CA (US); Mark Arana, Burbank, CA (US); Kevin Liao, Burbank, CA (US)

( * ) Notice: Subject to any disclaimer, the term of this patent is extended or adjusted under 35 U.S.C. 154(b) by 239 days.

(21) Appl. No.: 13/939,604

(22) Filed: Jul. 11, 2013

(65) Prior Publication Data
US 2015/0020085 A1 Jan. 15, 2015

(51) Int. Cl.
- G11B 20/00 (2006.01)
- E05B 73/00 (2006.01)
- G11B 23/28 (2006.01)

(52) U.S. Cl.
CPC .... G11B 20/00876 (2013.01); E05B 73/0023 (2013.01); G11B 20/00086 (2013.01); G11B 23/287 (2013.01)

(58) Field of Classification Search
CPC .......... E05B 73/0023; G11B 20/00086; G11B 20/00876; G11B 33/045
See application file for complete search history.

(56) References Cited

U.S. PATENT DOCUMENTS

| | | | | |
|---|---|---|---|---|
| 3,862,555 A * | 1/1975 | Wirth | ...................... | E05B 63/12 206/1.5 |
| 4,254,879 A * | 3/1981 | Maule | ................................ | 211/4 |
| 6,021,894 A * | 2/2000 | Lakoski | ............. | G11B 33/0427 206/308.1 |
| 6,749,061 B2 * | 6/2004 | Clausen | ............. | G11B 33/0427 206/308.1 |
| 6,896,133 B2 * | 5/2005 | Spagna | ...................... | 206/308.2 |
| 8,113,344 B2 * | 2/2012 | Arun | ..................... | B29C 45/006 206/303 |
| 2002/0197434 A1 * | 12/2002 | Rosenbaum | .............. | G09F 3/02 428/41.8 |
| 2004/0040349 A1 * | 3/2004 | Guttadauro et al. | ........... | 70/57.1 |
| 2004/0100385 A1 * | 5/2004 | Hansen et al. | ............. | 340/572.9 |
| 2005/0082183 A1 * | 4/2005 | Fillier | ................ | G11B 33/0427 206/308.2 |
| 2006/0144729 A1 * | 7/2006 | Cheung | .............. | G11B 33/0427 206/308.1 |
| 2007/0068200 A1 * | 3/2007 | Roloff et al. | ..................... | 70/30 |

(Continued)

*Primary Examiner* — Nay Tun
(74) *Attorney, Agent, or Firm* — Sheppard, Mullin, Richter & Hampton LLP

(57) ABSTRACT

Apparatus, systems, and methods disclosed herein include apparatus, systems, and methods for securing the information contained on information discs, such as CD's, DVD's, Blu-Ray discs, or any optical media used for carrying information. The apparatus includes a security device that prevents unauthorized users from accessing the protected disc, discs, or spindle. The apparatus is such that any unauthorized attempts to unlock the locking device will result in damage to the disc, making it unreadable and/or unrenderable. The security device may be part of a system that also includes a network and a remote authentication server. Authentication data is transmitted over the network between the security device and the remote authentication server. The authentication data is then used to determine whether or not to unlock the security device.

29 Claims, 9 Drawing Sheets

(56) References Cited

U.S. PATENT DOCUMENTS

| | | | |
|---|---|---|---|
| 2008/0217352 A1* | 9/2008 | Frich | 221/154 |
| 2009/0280862 A1* | 11/2009 | Loughlin et al. | 455/556.1 |
| 2009/0321288 A1* | 12/2009 | Arun | G11B 33/045 206/308.1 |
| 2010/0097223 A1* | 4/2010 | Kruest | E05B 47/0009 340/572.1 |
| 2010/0300163 A1* | 12/2010 | Loughlin et al. | 70/301 |
| 2014/0002239 A1* | 1/2014 | Rayner | 340/5.61 |

\* cited by examiner

APPARATUS AND SYSTEM TO SECURE AND MAINTAIN INTEGRITY OF A PHYSICAL DISC

TECHNICAL FIELD

The present disclosure relates generally to protecting the contents of a physical disc, and, more particularly, to apparatus and systems for physically securing a disc.

DESCRIPTION OF THE RELATED ART

Physical security of discs (e.g., DVD or Blu-Ray) containing sensitive or confidential information has generally been carried out using physical box cases around the disc to prevent access to the disc. However, with enough time and force, one is able to break open the physical box and obtain access to the disc without damaging the disc, the damage typically done only to the box. Due to the lack of security offered by these box cases, delivery of sensitive discs often require verified courier services, in which each party receiving the disc must verify that the disc has not been tampered with, opened, or accessed. These services are very expensive, sometimes costing thousands of dollars to ship a single item internationally. These courier shipping services, while costing significantly more, also take longer to ship an item than less secure, traditional shipping methods such as overnight shipping via Federal Express, United Parcel Service, the United States Postal Service, or the like.

BRIEF SUMMARY OF THE DISCLOSURE

According to various embodiments, the apparatus, systems, and methods described herein secure a physical disc so that the contents of the disc can only be accessed by authorized individuals.

In a first embodiment, the present disclosure is embodied in disc security device comprising an information shield for at least partially obscuring access to information on a disc, and a lock for securing the information shield to the disc. The information shield is removable from the disc when a pre-determined set of conditions are met. The information shield is secured to the disc such that removal of the information shield from the disc without meeting the pre-determined set of conditions results in damage to the disc.

In a more particular embodiment, the disc security device further comprises a top portion and a bottom portion. The top portion and the bottom portion are secured to the top and bottom surfaces of the disc, respectively, and are secured together by the lock. The disc security device may further comprise a plurality of corresponding interlocking members on the top and bottom portions, such that the interlocking members secure the top portion and the bottom portion to the disc when placed in an interlocking position.

In one aspect of this embodiment, the lock comprises a key tumbler, and the pre-determined set of conditions comprises unlocking the key tumbler using a matching key. In an alternative aspect of this embodiment, the lock comprises an electronic lock.

In a further aspect, the pre-determined set of conditions may comprise geographic restrictions such that the lock can only be unlocked when the disc security device is within an approved geographic location.

The disc security device may further comprise a near-field communications module. In an aspect of this embodiment, the pre-determined set of conditions may comprise the transmission of a password via the near-field communications module. The pre-determined set of conditions may also comprise the use of 2-factor authentication.

The disc security device may also comprise a network communications module for communicating over a wide-area network. In a further aspect of this embodiment, the network communications module may be configured to receive instructions on the pre-determined set of conditions over a wide-area network.

The present disclosure is also embodied in a disc security system. The system comprises a disc containing information, a server on a wide area network, and a disc security device. The disc security device comprises an information shield for at least partially obscuring access to the information on the disc, a lock for securing the information shield to the disc, and a network communications module for communicating over the wide area network. The information shield is removable from the disc when a pre-determined set of conditions are met, and the information shield is secured to the disc such that removal of the information shield without meeting the pre-determined set of conditions results in damage to the disc.

In one aspect of this embodiment, the disc security device may further comprise a top and bottom portion, wherein the top and bottom portions are secured to the top and bottom surfaces of the disc, respectively, and are secured together by the lock. The disc security device may further comprise a plurality of interlocking members on the top and bottom portions such that the interlocking members secure the top and bottom portions to the disc when placed in an interlocking position.

The lock may comprise a key tumbler, and the pre-determined set of conditions comprises unlocking the key tumbler using a matching key. Alternatively, the lock may comprise an electronic lock.

In a further aspect of this embodiment, the server may store data relating to the pre-determined set of conditions, and the determination of whether the pre-determined set of conditions is met is performed at the remote server. The pre-determined set of conditions may comprise geographic restrictions, such that the lock can only be unlocked if the disc security device is within an approved geographic location. The pre-determined set of conditions may also comprise transmission of a password over the wide-area network. In a further aspect, the pre-determined set of conditions may comprise the use of 2-factor authentication.

In yet another aspect of this embodiment, the disc may be identified using a unique disc identifier, and the pre-determined set of conditions may be associated with the unique disc identifier.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

Figure 1A:
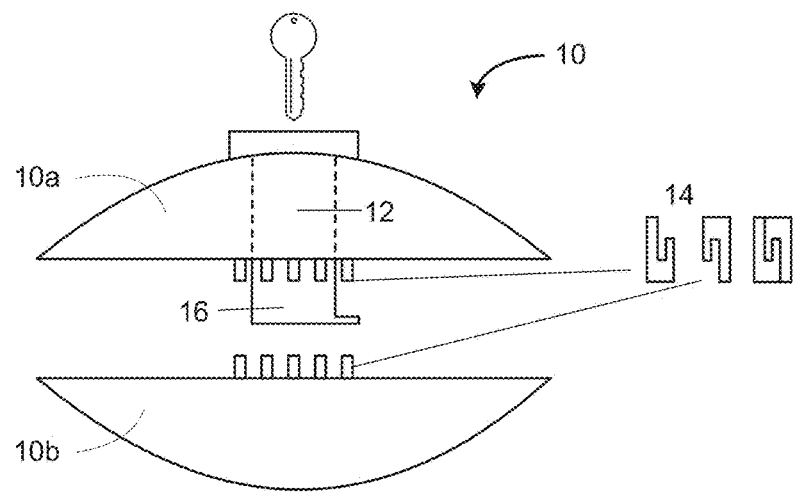
FIGS. 1A-E illustrate a standard disc security device in accordance with an embodiment of the present disclosure.

The disclosure provided herein describes apparatus, systems, and methods for securing and maintaining the integrity of a physical disc, such as a DVD or Blu-Ray disc.

FIGS. 1A-D illustrate an example of a standard disc security device in accordance with an embodiment of the present disclosure. The illustrated security device 10 is intended to secure the contents of a traditional CD, DVD, Blu-Ray, or similarly shaped information disc 18. The information disc 18 is generally circular in shape with an opening in the center of the disc, and data inscribed into the disc on the bottom surface. The security device 10 comprises a top portion 10a and a bottom portion 10b. The top portion 10a and the bottom portion 10b are placed on the top surface and the bottom surface of the information disc 18, and the two portions 10a, 10b are secured together to prevent access to the information disc 18. The bottom portion 10b shields access to the information disc 18 by at least partially shielding the bottom surface of the disc on which information is inscribed. The top portion 10a may include a key tumbler 12 with a plug end 16. The plug 16 of the key tumbler 12 is shaped such that it can be inserted through the center opening of the information disc 18.

Figure 1B:
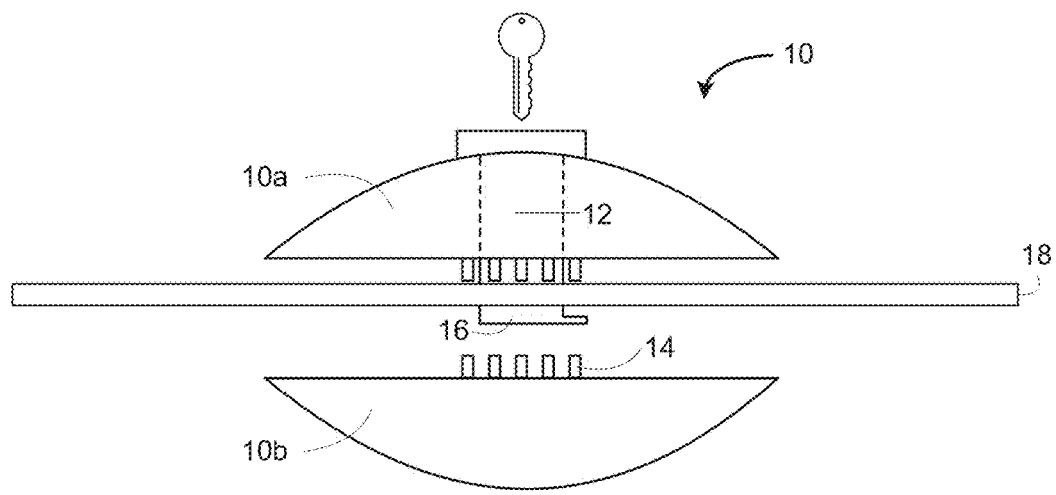

FIG. 1B depicts the security device 10 in an unlocked state, but the plug 16 has been inserted through the center opening of the information disc 18. The bottom portion 10b is configured to receive the plug 16 of the key tumbler 12. Once the plug 16 is received in the bottom portion 10b, the key tumbler 12 may be locked using a key. Locking the key tumbler 12 secures the top portion 10a and the bottom portion 10b together, thereby preventing access to the information disc 18. The top portion 10a and the bottom portion 10b may also comprise interlocking teeth 14 that further secure the two portions of the security device 10 together. In the depicted embodiment, the interlocking teeth 14 are shaped such that when the top portion 10a and the bottom portion 10b are joined and then rotated, the interlocking teeth 14 lock with each other and prevent vertical separation of the top and bottom portions 10a and 10b. As such, in the depicted embodiment, the top portion 10a and the bottom portion 10b are secured together by inserting the plug 16 into the bottom portion 10b, then twisting the top portion 10a and the bottom portion 10b relative to each other so as to lock the interlocking teeth 14. The key tumbler 12 is then locked using a key. Locking the key tumbler 12 prevents any further rotation of the top portion 10a and the bottom portion 10b, and the interlocking teeth 14 remain in the interlocked position until the key tumbler 12 is unlocked, and the top and bottom portions 10a, 10b can be rotated to separate the interlocked teeth 14.

Figure 1C:
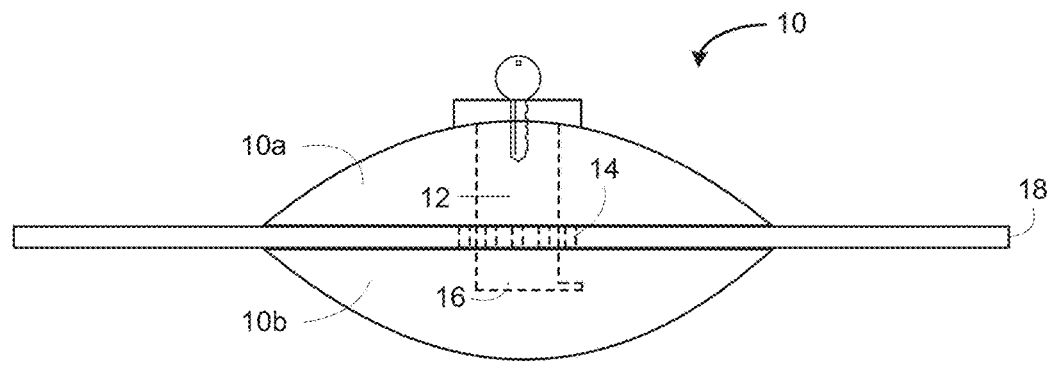

FIG. 1C depicts the security device 10 with the top portion 10a and the bottom portion 10b secured around the information disc 18. The interlocking teeth 14 on the top portion 10a and the bottom portion 10b have been rotated into the interlocked position, and the key tumbler 12 has been locked to prevent rotation or separation of the top portion 10 and the bottom portion 10b. The interlocking teeth 14 on the top portion 10a may be part of the key tumbler 12 such that rotation of a key to lock the key tumbler 12 results in the interlocking teeth 14 becoming interlocked, and rotation of a key to unlock the key tumbler 12 results in the interlocking teeth 14 becoming separated.

Figure 1D:
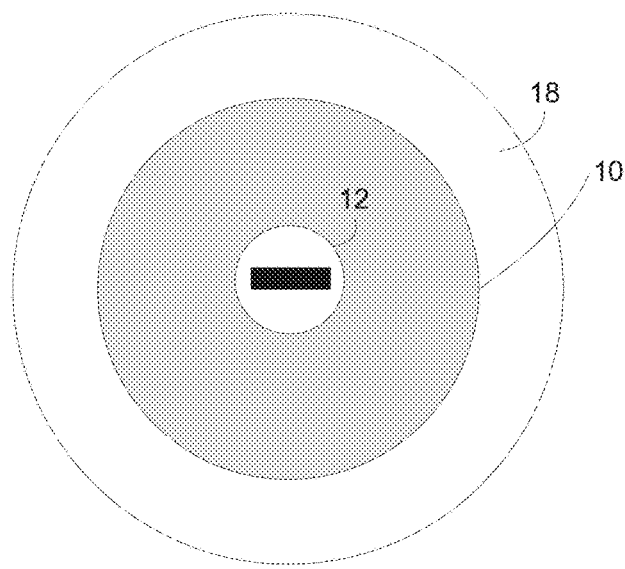

FIG. 1D provides a top-down view of the security device 10 locked on the information disc 18. By locking the security device 10 on the information disc 18, an unauthorized user cannot access the data on the information disc 18. Additionally, any attempts to improperly remove the security device 10 will result in damage to the information disc 18. As such, even if the security device 10 is removed, the disc 18 itself (and, therefore, the information on the disc 18) will be damaged, thereby preventing unauthorized access to the information. Although the figures depict the radius of the security device 10 as being smaller than the radius of the information disc 18, it should be understood that the radius of the security device 10 may be smaller than, equal to, or greater than the radius of the information disc 18. Additionally, while the figures illustrate a generally circular security device 10, the security device 10 may be any other shape that conforms to the general principles described in this disclosure.

Figure 1E:
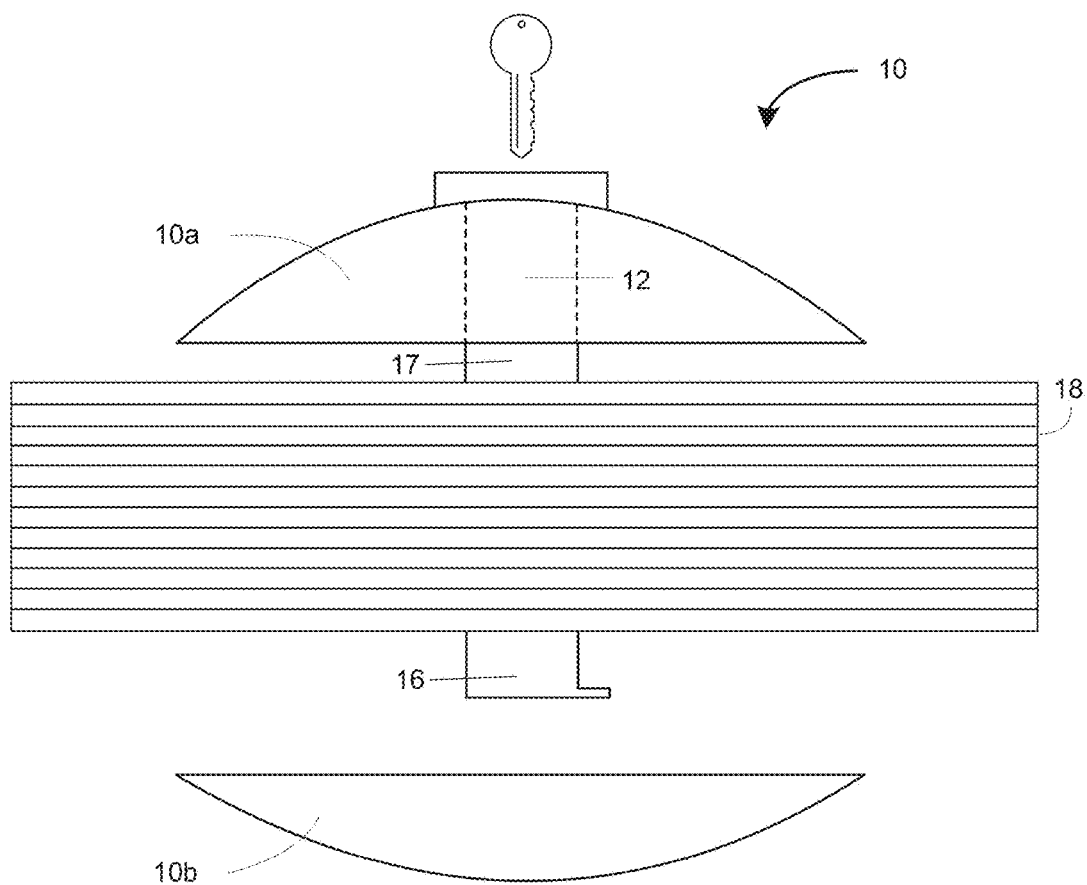
Figure 2A:
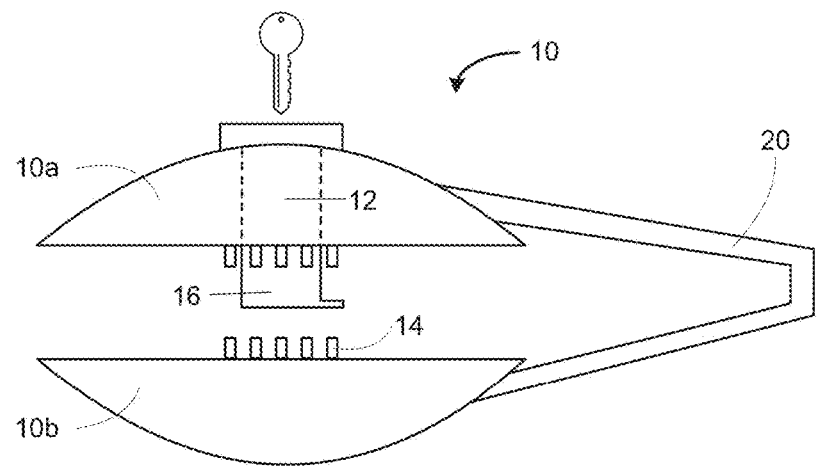
FIGS. 2A-D illustrate a standard disc security device with a U-bar in accordance with an embodiment of the present disclosure.
Figure 2B:
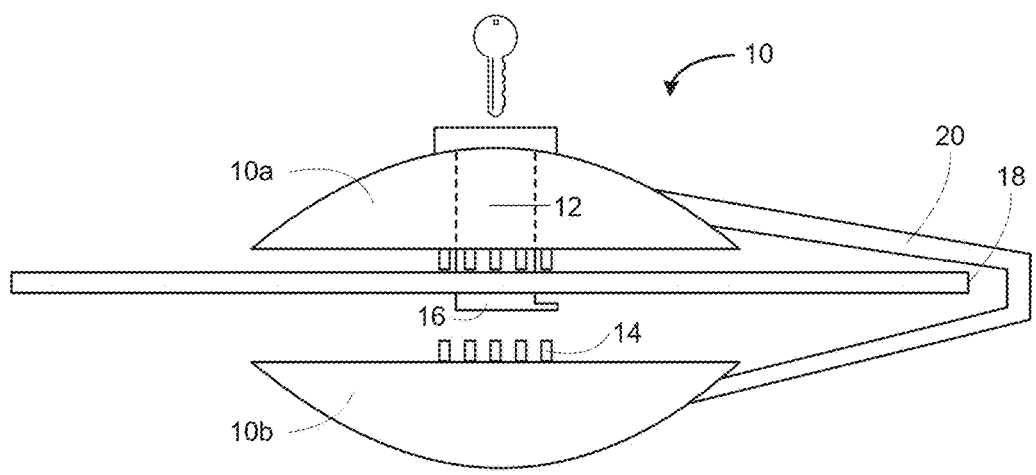
Figure 2C:
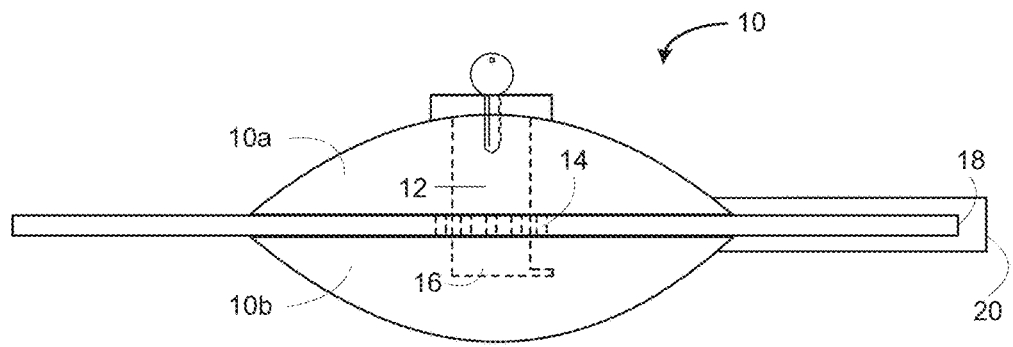
Figure 2D:
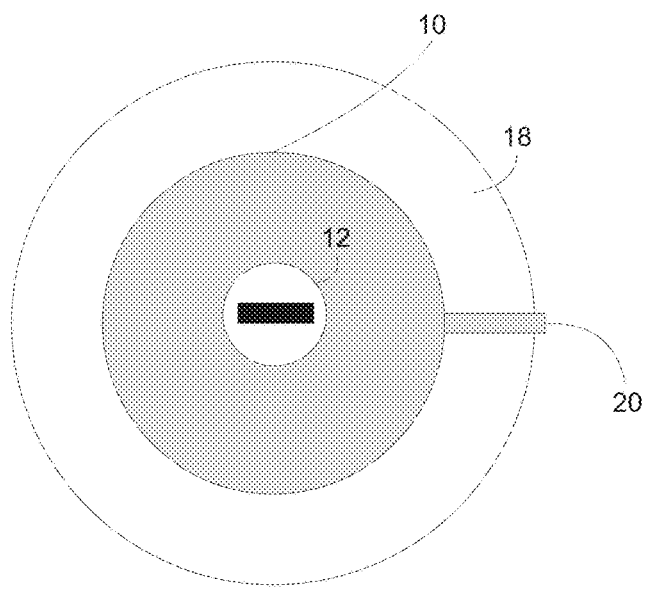

The depicted embodiments may also be slightly revised so that multiple discs can be secured by the security device 10. For example, the key tumbler 12 may be altered to include an elongated spindle 17 that is long enough to fit multiple discs 18. An example of this embodiment is provided in FIG. 1E. Additionally, the elongated spindle may be adjustable in length so that a single security device 10 may be used to snugly secure a variable number of discs.

FIGS. 2A-D provide a slightly revised embodiment of the security device 10. In this embodiment, the security device 10 further comprises a "U-bar" 20 that connects the top portion 10a and the bottom portion 10b, and is shaped such that when the two portions 10a, 10b are secured around an information disc 18, the U-bar 20 comes into contact with the information disc 18. As was described above, it may be desirable for the security device 10 to damage the information disc 18 if any individual tries to improperly remove the security device 10 from the information disc 18. The U-bar 20 assists in this objective in the case where the radius of the security device 10 is smaller than the radius of the information disc 18. In this particular embodiment, the U-bar 20 may provide the benefit of damaging the outer areas of the information disc 18 if anyone tries to improperly remove the security device 10.

Figure 3:
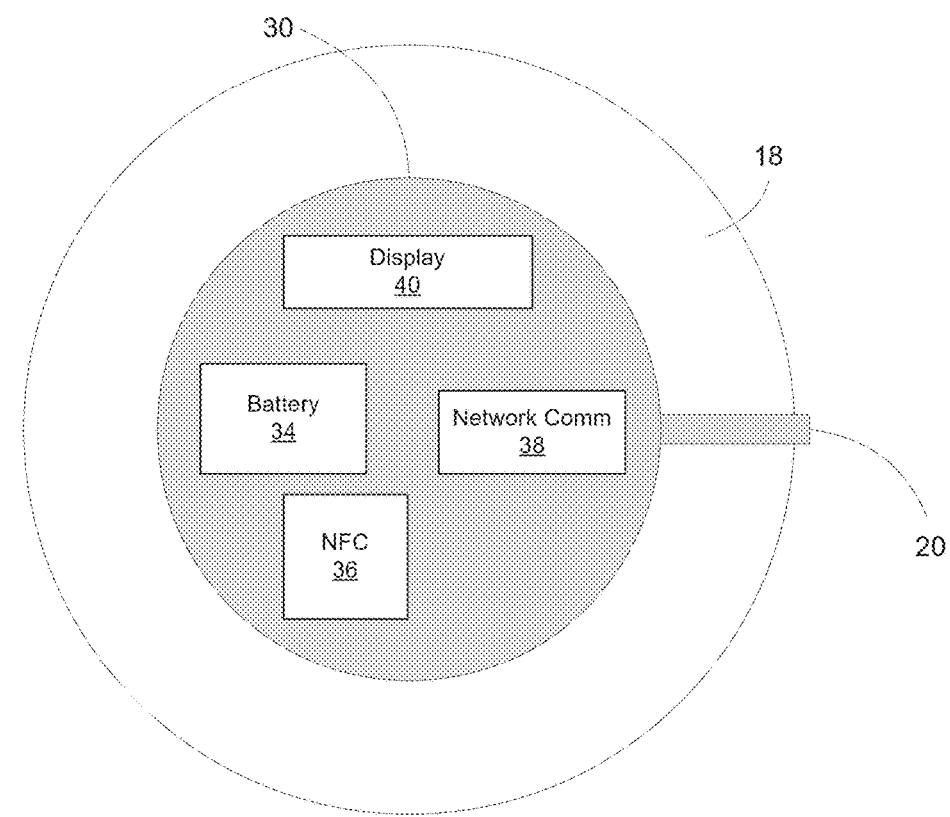
FIG. 3 illustrates an electronic disc security device in accordance with an embodiment of the present disclosure.

The embodiments discussed to this point have utilized strictly mechanical means for securing the security device 10 to an information disc 18. FIG. 3 illustrates an electronic security device 30 in accordance with another embodiment of the present disclosure. To implement the electronic security device 30, the mechanical key tumbler 12 of FIGS. 1-2 may be replaced with an electronic locking mechanism, possibly through the use of an electronic servo-based lock. In the embodiment shown in FIG. 3, the electronic security device 30 comprises a top portion 30a, a bottom portion 30b, an electronic lock 32, a battery 34, a near-field communications (NFC) module 36, a network communications module 38, and a display 40. The electronic lock 32 (not pictured) plays a role similar to that of mechanical key tumbler 12 of FIGS. 1-2, and secures the top portion 30a to the bottom portion 30b. The battery 34 may be used to power all of the electronic components of the electronic security device 30. The battery 34 may be any appropriate battery to power such devices, such as NiMH, Li-ion, Li-ion polymer, or NiCd batteries.

In one embodiment, the NFC module 36 may provide a means by which to unlock the electronic lock 32. The NFC module 36 can communicate with other nearby devices that are NFC enabled. These other devices may be used to unlock the electronic lock 32. For example, an authorized user may receive a secure application to transmit a passcode via NFC protocols to the electronic security device 30's NFC module 36. The NFC device running the secure application may be any appropriate device, such as a laptop, personal computer, mobile phone, or any computing device enabled with NFC capabilities. The NFC module 36 may also be used to implement a Two-Factor Authentication process.

A Two-Factor (or Three-Factor) Authentication process requires a user to authenticate their identity using two (or three) authentication factors. Examples of such authentication factors might include: 1) something the user knows (e.g., a password or PIN); 2) something the user has (e.g., a smart card or mobile device); and/or 3) something the user is (e.g., a biometric characteristic such as a fingerprint or retinal scan). In one example, the NFC module 36 may communicate with an authenticated user's mobile device to allow the user to enter their password on the mobile device (first factor: something the user knows). Then, an application on the user's mobile device may authenticate to the electronic security device 30 that the carrier of the mobile device is authorized to access the information disc 18 (second factor: something the user has). Alternatively, or in addition to the above, the electronic security device 30 may itself include a means for user input, such as a keypad, fingerprint scanner, retinal scanner, touchpad, or any other appropriate user input means, so that the user can directly input an authentication factor without using a separate device. The display 40 may be used to display the user's input or any other useful information.

Figure 4:
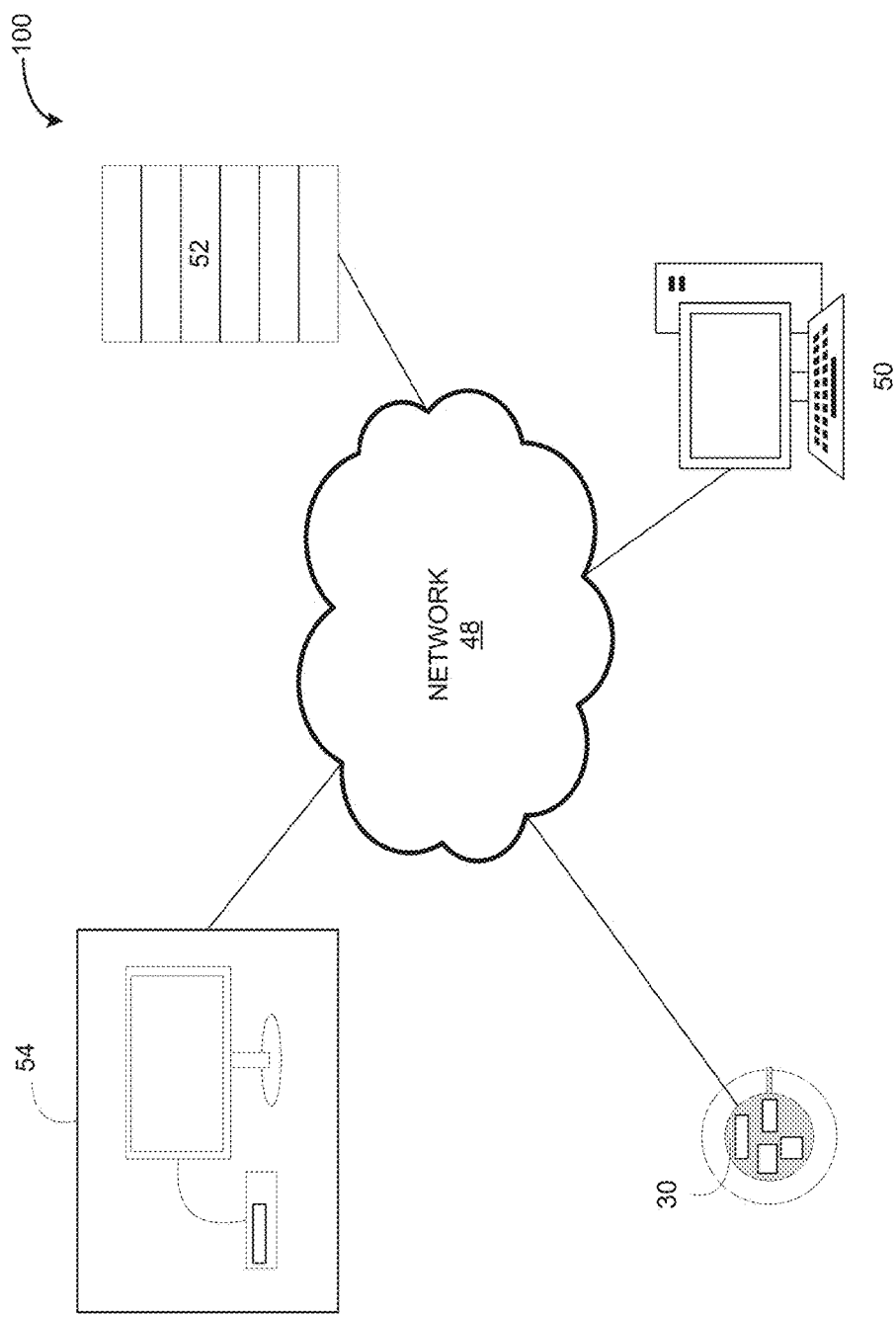
FIG. 4 illustrates a network diagram of a disc security system in accordance with an embodiment of the present disclosure.

While the NFC module 36 allows for near field communications with nearby devices, the network communications module 38 may allow the electronic security device 30 to communicate with other devices on a wide area network. For example, the network communications module 38 may enable WiFi connections, wired internet connections, or it may be a cellular chip that allows for cellular connections such as 3G, 4G, or 4G LTE. Such wide area connections may be used in numerous ways, some of which will be described here with reference to FIG. 4, which provides a network diagram of an exemplary physical disc security system 100 in accordance with one embodiment of the present disclosure. The system 100 comprises an information disc 18, and an electronic security device 30, as have been previously described. The electronic security device 30 is connected to a network 48 via the network communications module 38. Also connected to the network 48 are a computing device 50, a remote database 52, and a disc reader 54. The network 48 may comprise any wide area network, the most common of which is the Internet. However, any network may be used. The computing device 50 may be any computing device capable of carrying out the functions described below, and may include a personal computer, a remote server, or other appropriate computing devices. The remote database 52 is any device capable of data storage and is able to store authentication data and use restrictions, as will be described in greater detail below.

In one embodiment, the network communications module 38 of the electronic security device 30 may communicate location information so that geographic restrictions might be placed on the electronic security device 30. For example, the electronic security device 30 may be restricted to opening only with a half-mile of a particular geographic location corresponding to authorized individuals, such as those individuals' home or work addresses. These geographic restrictions might be stored in the remote database 52 for look-up whenever an unlock request is made by the electronic security device 30. In this configuration, if a user enters authentication information and attempts to unlock the electronic security device 30, the device 30 would transmit geographic information (and any other relevant authentication information) to the remote database 52. At the remote database 52, the transmitted data is compared to all restrictions placed on the electronic security device 30 (e.g., geographic data) to make sure that all restrictions are met. If the electronic security device 30 is not within an authorized geographic region, then the electronic security device 30 would be prevented from opening.

In addition to or instead of geographic restrictions, the electronic security device 30 may also include time restrictions such that the electronic security device 30 can only be opened during certain times, or can only be removed from the electronic security device 30 for a specified period of time. Using the network communications module 38, the electronic security device 30 may communicate with the remote database 52 to indicate the time at which it has been unlocked. If the information disc 18 has been removed from the electronic security device for longer than the allotted period of time, then the remote database 52 may trigger an alarm, such as a text message, phone call, email, or other message, that informs the user that the information disc 18 must be returned to the electronic security device 30.

The network communications module 38 allows for such time or geographic restrictions to be stored on the remote database 52 so that a comprehensive list of all discs 18 and security devices 30 and their corresponding restrictions and statuses (e.g., "locked" or "unlocked") can be tracked. The remote database 52 may keep track of all successful or attempted locking or unlocking events for a particular disc 18 or electronic security device 30. This information may be used so that the number of times a security device is unlocked can be capped (e.g., disc can only be accessed 3 times), or the number of attempted logins can be capped (e.g., three unsuccessful unlock attempts results in bricking of security device). Alternatively, this information may be stored locally on a local memory on the electronic security device 30.

When a user attempts to open the electronic security device 30, location, time, or other required information may be transmitted to the remote database 52. The restrictions specific to that particular electronic security device 30 would then be pulled up, and the remote database 52 could make a determination as to whether all of the restrictions are satisfied. For example, if unlocking of the electronic security device 30 requires a particular password and geographic location, then password and geographic information would be transmitted to the remote database 52, which would then compare that information to the stored restrictions for the particular electronic security device 30. If the restrictions are satisfied, then the remote database 52 could transmit an "unlock" signal to the electronic security device 30 to electronically unlock the device. However, if the restrictions are not satisfied, then the remote database 52 would send a rejection signal, or fail to send an "unlock" signal, and the electronic security device 30 would remain locked. In an alternative embodiment, such time or geographic restrictions may be stored locally on a local memory in the electronic security device 30, and comparisons may be performed locally. In yet another alternative embodiment, the authentication information may be stored in the remote database 52, but the comparison of the inputted information and the stored authentication information may occur on the electronic security device 30.

Another example of a time-based restriction may be that a disc becomes locked forever after a specified period. For example, if it is specified that a disc 18 must be used and returned to the electronic security device 30 within 72 hours, then, after 72 hours, with the disc 18 in the electronic security device 30, the electronic security device 30 may "brick" the electronic lock so that it can never be opened again. Alternatively, after a particular user's use period expires, the access authentication credentials required to open the electronic security device 30 could change so that, while that particular user can no longer open the electronic security device 30, it may be opened by another user. If a traditional key tumbler is used in an electronic security device 30, the pins in the key tumbler may be changed, after a specified period of time, so that a particular user's key will no longer unlock the electronic security device 30.

In the above-described configurations, the network communications module 38 may also allow for remote unlocking of the electronic security device 30. For example, an authenticated user may be required to log into a certain website, possibly using personal computer 50, to unlock the electronic security device 30. The remote database 52 may then authenticate the user-specified information and provide a signal over the wide area network to the electronic security device 30 to unlock the disc 18. Alternatively, the user may be able to call a telephone number, and authenticate themselves, the telephone authentication causing a computing device to transmit an "unlock" signal to the electronic security device 30 over the network 48.

The disc reader 54 may also play a role in keeping the information on the disc 18 secure. Once the user's credentials have been authenticated, and the electronic security device 30 has been unlocked, the information on the disc 18 may be read using the disc reader 54. When the disc 18 is being read by the disc reader 54, the disc reader 54 may send a "heartbeat" signal to the remote database 52 to establish that the disc 18 is being read. In order to ensure that discs, once used, are not being discarded or left around in a non-secure fashion, it may be required that discs 18 be returned to the electronic security device 30 within a certain period of time after reading of the disc is completed. In order to carry out this objective, once the disc reader 54 stops reading the disc 18, and the "heartbeat" signal ceases, the remote database 52 may start a timer and, after a certain period of time, contact the user to remind them that the disc 18 must be returned to the electronic security device 30.

The disc reader 54's communication over the network may also enable real-time authentication of access to the disc's information. In this embodiment, the disc reader 54 may receive a disc 18, and attempt to access its information. In its attempt to access the information, the disc reader may communicate with the remote database 52 to provide access credentials. The remote database 52 may then make a determination as to whether the provided credentials are sufficient for the user to access the disc. Real-time authentication of disc access allows for immediate changes in status regarding a particular disc so that if a disc is stolen or goes missing, the remote database 52's data may be updated to prevent any users from accessing the disc 18 at all. This step may also be implemented in the remote database 52's data regarding whether or not to unlock the electronic security device 30, so that if the disc 18 is stolen, the electronic security device 30 will brick itself and refuse to open. The disc reader 54 may also be enabled with a near field communications module so that it can communicate with the electronic security device 30 using NFC protocols. This way, the disc reader 54 could send the "heartbeat" or real-time authentication information through the electronic security device 30, even if the disc reader itself is not connected to the network 48.

Figure 5:
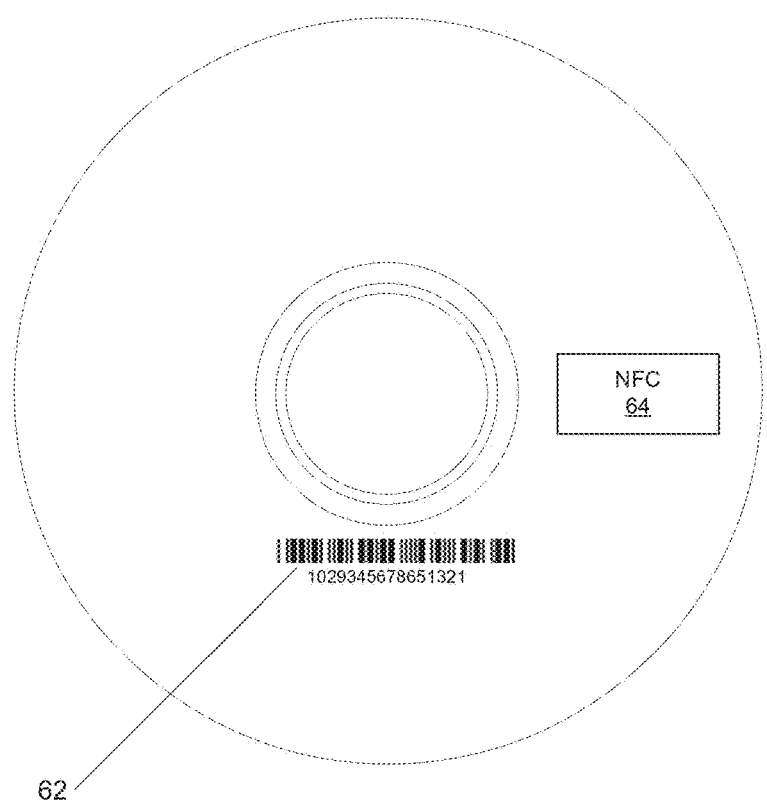
FIG. 5 illustrates an information disc that may be used to implement various features of embodiments of the systems and apparatus described herein.

As discussed above, it is contemplated that there may be multiple electronic security devices 30 connected to multiple information discs 18, each with their own unique user, geographic, time, and use restrictions. As such, it may be desirable for each electronic security device 30 to be associated with a specific disc 18 so that such differing restrictions may be efficiently and correctly enforced. FIG. 5 provides a diagram of an exemplary information disc 18 that is branded with a serial number 62 and a NFC module 64. The serial number 62 may be unique to the disc 18. Therefore, an electronic security device 30 may be tied to a particular disc 18 through the use of the serial number 62, and then the restrictions specific to that serial number 62 may be applied to the paired electronic security device 30. When a disc 18 is placed within the electronic security device 30, the NFC module 64 on the disc 18 may communicate with the NFC module 36 on the electronic security device 30 to provide the disc's serial number. Alternatively, a bar code scanner on the electronic security device 30 may read the serial number bar code to ensure that the correct disc is being locked. The electronic security device 30 will only secure the disc 18 if the correct serial number 62 is provided. This helps to minimize fraud by ensuring that the correct disc is being locked in the electronic security device 30. This also helps to ensure that the use restrictions for a specific disc are being followed because the geographic and time data being transmitted from the electronic security device 30 to the remote database 52 are disc-specific. For example, if a disc 18 must be returned to its electronic security device 30 by a certain time, it may be required that the electronic security device 30 transmit a "disc locked" time to the remote database 52 to ensure that the time requirement is satisfied. However, if the wrong disc is placed into the electronic security device 30, it will refuse to lock the disc, and the status of the disc, as maintained by both the electronic security device 30 and the remote database 52, will remain "unlocked." Only when the correct disc is locked in the electronic security device 30 will the device send a "disc locked" signal and time to the remote database 52, at which point, the time will be recorded and the disc status will change from unlocked to locked.

Alternatively, the unique serial number 62 may also allow for security devices 30 to be used interchangeably without being tied to a specific disc 18 because all restrictions could be disc-specific, rather than security device-specific. In this configuration, disc-specific restriction data may be stored on the remote database 52. Any time an electronic security device 30 attempts to lock or unlock a disc 18, the disc's serial number 62 would be scanned in and transmitted to the remote database 52. Then, the appropriate disc-specific restrictions could be applied to the electronic security device 30. By using this configuration, security devices 30 would be interchangeable, since the necessary restrictions would be disc-specific and stored on the remote database 52 for look-up by any electronic security device 30.

Figure 6:
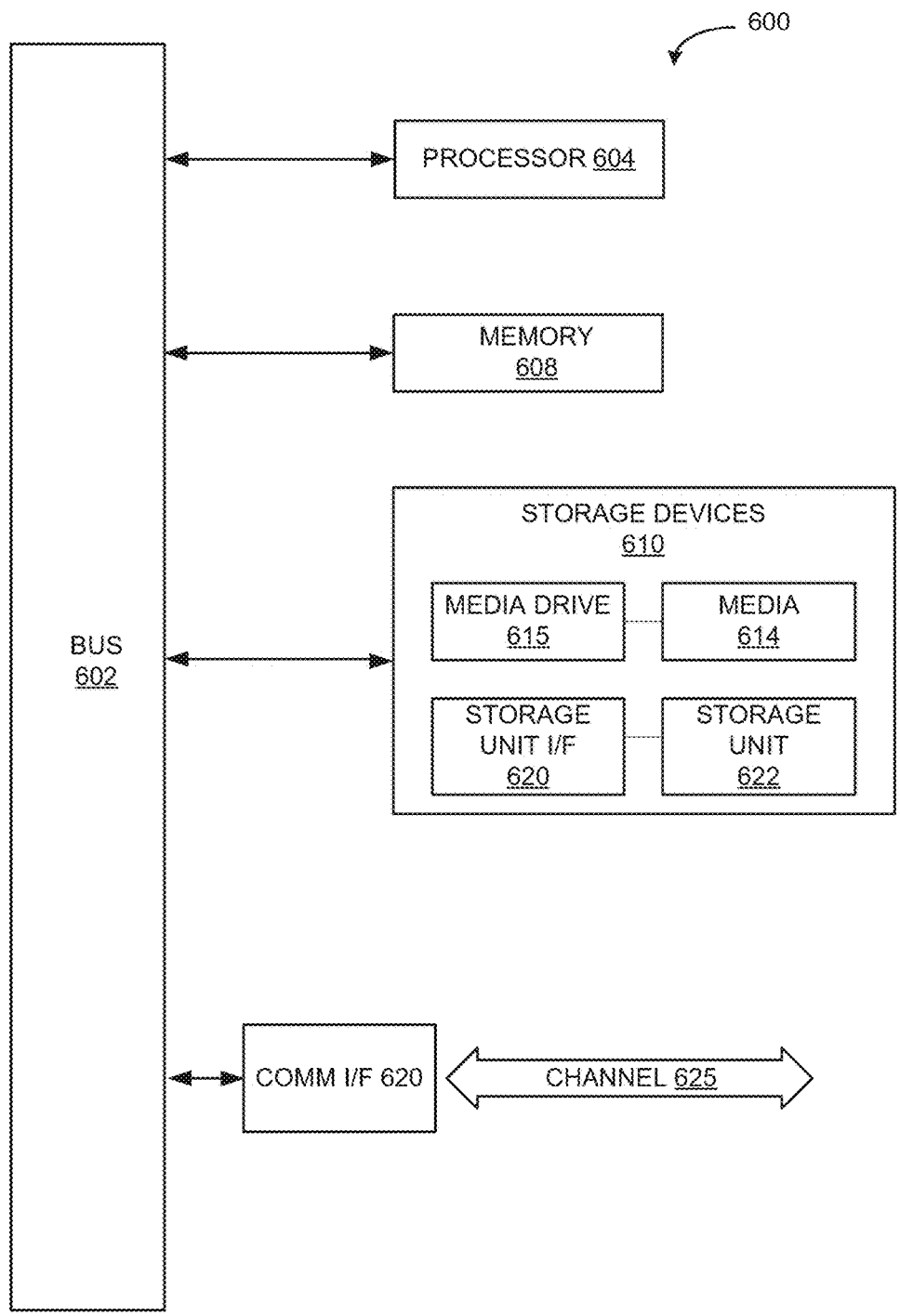
FIG. 6 illustrates a computing module that may be used to implement various features of embodiments of the systems and apparatus described herein.

For example, consider a disc 18 requires a particular user's PIN to open, geographic restriction that it can only be opened in Los Angeles, Calif., and two time-based restrictions: (1) it must be returned to an electronic security device 30 within 72 hours of being unlocked, and (2) after 72 hours, the PIN required to access the disc 18 must be changed so that the next authorized user can access the disc. The disc 18 could be placed in a first security device 30A, at which point the device 30A would transmit the disc's serial number 62 to a remote database 52, indicating that the disc has been locked and the time at which it was locked. Later, when an authorized user attempts to open the security device 30A, the device 30A will transmit PIN and geographic information to the remote database 52 to ensure that the restrictions on disc 18 are met. If met, the device 30A will unlock the disc and transmit an unlock time to the remote database 52. This will then start the 72-hour unlock window for the disc 18. Once 72 hours pass, the remote database 52 could send an automated message to the user stating that the disc 18 must be returned to an electronic security device 30. At this point, the user could pick up any security device to lock the disc 18. If the user chooses to lock the disc 18 with another security device 30B, then the new security device 30B would transmit the disc's serial number 62 to the remote database 52, lock the disc, and transmit confirmation that the disc has been locked along with the time at which the disc was locked. The next time anyone tries to access the disc 18 using security device 30B, the disc's serial number would again be transmitted to the remote database 52, at which time, the new PIN and geographic requirements must be met in order to unlock the security device 30B. In this way, two different security devices 30A and 30B have been used to carry out the restrictions on a single disc 18. As this example illustrates, unique disc serial numbers and disc-specific use restrictions may enable security devices to be used interchangeably.

Where components or modules of the disclosed systems are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the disclosure using other computing modules or architectures.

Referring now to FIG. 6, computing module 600 may represent, for example, computing or processing capabilities found within desktop, laptop and notebook computers; hand-held computing devices (PDA's, smart phones, tablets, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, electronic security device 30, device reader 54, remote database 52, computer 50, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, random access memory (RAM) or other dynamic memory might be used for storing information and instructions to be executed by processor 404. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

While various embodiments of the present disclosed systems and methods have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed systems or methods, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A disc security device, comprising:
a top portion secured on a top surface of a disc, the top portion comprising a first plurality of interlocking teeth;
a bottom portion secured on a bottom surface of the disc, the bottom portion comprising a second plurality of corresponding interlocking teeth, wherein at least one of the top portion and the bottom portion contacts an information-bearing surface of the disc;
a U-bar connecting the top portion and the bottom portion, wherein the U-bar is shaped such that when the top portion and the bottom portion are secured together the U-bar contacts only a portion of an information-bearing surface of the disc; and
a lock for securing the disc security device to the disc, and for securing the top portion to the bottom portion, wherein,
the lock is a part of the top or bottom portion, and the lock includes a plug that is inserted through a center opening of the disc and couples the top portion to the bottom portion,
the disc security device is removable from the disc when a pre-determined set of conditions are met,
the disc security device is secured to the disc such that removal of the disc security device from the disc without meeting the pre-determined set of conditions results in damage to the disc, and
the first and second pluralities of interlocking teeth secure the top portion and the bottom portion to the disc when placed in an interlocking position, wherein the first plurality of interlocking teeth and the second plurality of interlocking teeth are interlocked or separated by rotating the top and bottom portions.

2. The disc security device of claim 1, wherein the lock comprises a key tumbler, wherein the key tumbler comprises the plug, wherein the pre-determined set of conditions comprises unlocking the key tumbler by rotating a matching key, and wherein the interlocking teeth are a part of the key tumbler such that rotation of the matching key to lock the key tumbler results in the interlocking teeth becoming interlocked, and rotation of the matching key to unlock the key tumbler results in the interlocking teeth becoming separated.

3. The disc security device of claim 1, wherein the lock comprises an electronic lock.

4. The disc security device of claim 3, wherein the pre-determined set of conditions comprise geographic restrictions such that the lock can only be unlocked when the security device is within an approved geographic location.

5. The disc security device of claim 3, wherein the pre-determined set of conditions comprise time restrictions such that the lock can only be unlocked within an approved period of time.

6. The disc security device of claim 3, further comprising a near-field communications module.

7. The disc security device of claim 6, wherein the pre-determined set of conditions comprise transmission of a password via the near-field communications module.

8. The disc security device of claim 3, wherein the pre-determined set of conditions comprises the use of 2-factor authentication.

9. The disc security device of claim 8, wherein the 2-factor authentication requires a user to meet any combination of: a time-based restriction, a location-based restriction, or a biometric identification restriction.

10. The disc security device of claim 3, further comprising a network communications module for receiving information over a wide-area network.

11. The disc security device of claim 10, wherein the network communications module is configured to receive instructions on the pre-determined set of conditions over a wide-area network.

12. The disc security device of claim 3, further comprising a biometric reader, wherein the pre-determined set of conditions comprises identification of a user using the biometric reader.

13. The disc security device of claim 12, wherein the biometric reader is configured to identify a user using at least one of: a fingerprint scan, an ocular scan, or facial recognition.

14. The disc security device of claim 1, wherein the top portion and bottom portion are rotatingly coupled, and wherein the lock secures the top portion to the bottom portion by preventing rotation of the top portion relative to the bottom portion.

15. A disc security system comprising:
one or more discs containing information;
a server on a wide area network; and
a disc security device comprising
a top portion secured on a top surface of a disc of the one or more discs, the top portion comprising a first plurality of interlocking teeth;
a bottom portion secured on a bottom surface of a disc of the one or more discs, the bottom portion comprising a second plurality of corresponding interlocking teeth, wherein at least one of the top portion and the bottom portion contacts an information-bearing surface of a disc of the one or more discs;
a U-bar connecting the top portion and the bottom portion, wherein the U-bar is shaped such that when the top portion and the bottom portion are secured together the U-bar contacts only a portion of an information-bearing surface of a disc of the one or more discs;
a lock for securing the disc security device to the one or more discs, and for securing the top portion to the bottom portion; and
a network communications module for communicating over the wide area network,
wherein,
the lock is a part of the top or bottom portion, and the lock includes a plug that is inserted through a center opening of the one or more discs and couples the top portion to the bottom portion,
the disc security device is removable from the one or more discs when a pre-determined set of conditions are met, and
the disc security device is secured to the one or more discs such that removal of the disc security device from the one or more discs without meeting the pre-determined set of conditions results in damage to the one or more discs, and
the first and second pluralities of interlocking teeth secure the top portion and the bottom portion to the one or more discs when placed in an interlocking position, wherein the first plurality of interlocking teeth and the second plurality of interlocking teeth are interlocked or separated by rotating the top and bottom portions.

16. The disc security system of claim 15, wherein the lock comprises a key tumbler, wherein the key tumbler comprises the plug, wherein the pre-determined set of conditions comprises unlocking the key tumbler by rotating a matching key, and wherein the interlocking teeth are a part of the key tumbler such that rotation of the matching key to lock the key tumbler results in the interlocking teeth becoming interlocked, and rotation of the matching key to unlock the key tumbler results in the interlocking teeth becoming separated.

17. The disc security system of claim 15, wherein the lock comprises an electronic lock.

18. The disc security system of claim 17, wherein the server stores data relating to the pre-determined set of conditions.

19. The disc security system of claim 18, wherein determination of whether the pre-determined set of conditions are met is performed at the remote server.

20. The disc security system of claim 18, wherein the pre-determined set of conditions comprise geographic restrictions, such that the lock can only be unlocked if the disc security device is within an approved geographic location.

21. The disc security system of claim 18, wherein the pre-determined set of conditions comprise time restrictions such that the lock can only be unlocked within an approved period of time.

22. The disc security system of claim 18, wherein the pre-determined set of conditions comprises transmission of a password over the wide-area network.

23. The disc security system of claim 18, wherein the pre-determined set of conditions comprises the use of 2-factor authentication.

24. The disc security system of claim 18, wherein the 2-factor authentication requires a user to meet any combination of: a time-based restriction, a location-based restriction, or a biometric identification restriction.

25. The disc security system of claim 18, the disc security device further comprising a biometric reader, wherein the pre-determined set of conditions comprises identification of a user using the biometric reader.

26. The disc security system of claim 25, wherein the biometric reader is configured to identify a user using at least one of: a fingerprint scan, an ocular scan, or facial recognition.

27. The disc security system of claim 18, wherein the one or more discs are identified using a unique identifier, and the pre-determined set of conditions are associated with the unique disc identifier.

28. The disc security system of claim 15, wherein the top portion and bottom portion are rotatingly coupled, and wherein the lock secures the top portion to the bottom portion by preventing rotation of the top portion relative to the bottom portion.

29. A disc security device, comprising:
- a top portion secured on a top surface of a first disc of a plurality of discs, the top portion comprising a first plurality of interlocking teeth;
- a bottom portion secured on a bottom surface of a second disc of the plurality of discs, the bottom portion comprising a second plurality of corresponding interlocking teeth, wherein at least one of the top and the bottom portion is in contact with an information-bearing surface of the first disc or the second disc;
- a U-bar connecting the top portion and the bottom portion, wherein the U-bar is shaped such that when the top portion and the bottom portion are secured together the U-bar contacts only a portion of an information-bearing surface of the first disc or the second disc;
- a lock for securing the disc security device to the plurality of discs, and for securing the top portion to the bottom portion; and
- a length-adjustable spindle inserted through a center opening of the plurality of discs and coupling the top portion to the bottom portion, wherein the disc security device is removable from the plurality of discs when a pre-determined set of conditions are met, the disc security device is secured to the plurality of discs such that removal of the disc security device from the plurality of discs without meeting the pre-determined set of conditions results in damage to the plurality of discs, and the first and second pluralities of interlocking teeth secure the top portion and the bottom portion to the plurality of discs when placed in an interlocking position, wherein the first plurality of interlocking teeth and the second plurality of interlocking teeth are interlocked or separated by rotating the top and bottom portions.

\* \* \* \* \*